(12) United States Patent
Cromer et al.

(10) Patent No.: US 6,397,249 B1
(45) Date of Patent: *May 28, 2002

(54) DATA PROCESSING SYSTEM AND METHOD FOR DETERMINING A PHYSICAL LOCATION OF A CLIENT COMPUTER SYSTEM

(75) Inventors: Daryl Carvis Cromer, Cary; Brandon Jon Ellison, Raleigh; Eric R. Kern, Durham; Gregory W. Kilmer; James Peter Ward, both of Raleigh; Howard Jeffery Locker, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/206,259

(22) Filed: Nov. 24, 1998

(51) Int. Cl.$^7$ ............................................ G06F 15/173
(52) U.S. Cl. ...................... 709/224; 709/223; 709/227; 709/228; 709/248; 370/402; 370/342
(58) Field of Search ................................. 370/255, 312, 370/331, 401, 402, 342; 340/10.6, 10.42, 572.1, 825; 709/249, 223, 224, 227, 228, 248, 217; 455/433; 342/386; 701/207

(56) References Cited

U.S. PATENT DOCUMENTS

| | | | | |
|---|---|---|---|---|
| 5,812,531 A | * | 9/1998 | Cheung et al. ............. | 370/255 |
| 5,850,187 A | * | 12/1998 | Carrender et al. .......... | 340/10.6 |
| 6,002,344 A | * | 12/1999 | Bandy et al. ............ | 340/825.54 |
| 6,029,193 A | * | 2/2000 | Yamamoto et al. .......... | 709/217 |
| 6,084,512 A | * | 7/2000 | Elberty et al. ............ | 340/572.1 |
| 6,115,754 A | * | 9/2000 | Landgren ..................... | 709/249 |
| 6,216,087 B1 | * | 4/2001 | Want et al. .................. | 701/207 |
| 6,272,541 B1 | * | 8/2001 | Cromer et al. .............. | 709/224 |
| 6,188,353 B1 | * | 12/2001 | Mitchell ..................... | 342/386 |

* cited by examiner

Primary Examiner—Krisna Lim
Assistant Examiner—Chuong Ho
(74) Attorney, Agent, or Firm—Bracewell & Patterson, LLP; J. Bruce Schelkopf

(57) ABSTRACT

A data processing system and method are described for determining a physical location of a client computer system. The client and server computer systems are coupled together to form a local area network. Identifying information is associated with a tag. The client computer system transmits a wireless query signal to a physical region. In response to the tag being located within the physical region, the tag receives the wireless query signal. In response to a receipt of the query signal by the tag, the tag transmits a reply signal. The reply signal includes the identifying information. In response to a receipt of the reply signal by the client computer system, the physical location of the client computer system is determined utilizing the identifying information.

23 Claims, 6 Drawing Sheets

DATA PROCESSING SYSTEM AND METHOD FOR DETERMINING A PHYSICAL LOCATION OF A CLIENT COMPUTER SYSTEM

BACKGROUND OF THE INVENTION

1. Field of the Invention

The present invention relates in general to data processing systems and, in particular, to a data processing system and method for determining a physical location of a client computer system. Still more particularly, the present invention relates to a data processing system and method for identifying a physical location of a client computer system utilizing identifying information associated with a tag located within a physical region which includes the client.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as a system board, system planar, or planar) to electronically connect these components together. These systems are designed primarily to give independent computing power to a single user and are inexpensively priced for purchase by individuals or small businesses. Examples of such personal computer systems are IBM's Intellistation and IBM's PC 300 PL and PC 300 GL.

Typically, in a business environment, many computer systems are distributed throughout various locations within the physical facilities. Keeping track of the physical location of each computer system is difficult. The difficulty in maintaining an accurate record of each computer system's current physical location greatly increases as the number of computer systems increases. Contributing to this problem is the likelihood that at least some of these computer systems will be moved from one location to another.

Significant costs are associated with asset tracking of computer systems in a large business environment. Manually locating and inventorying each individual system is typically the method used.

In some known networked computer systems, each network controller may be associated with a unique address. Utilizing the unique address of the controller, each client physically coupled to a server forming the network may be identified. However, the address of the controller is not associated with a physical location. Therefore, if the controller is moved to a new physical location, the record of the physical locations of the computer systems becomes inaccurate.

Universal unique identifiers (UUIDs) are well known in the PC industry which may be associated with each computer system included within a data processing system. Utilizing the UUIDs, each computer system may be uniquely identified. The UUID associated with a particular computer system identifies the computer system, but not the physical location of the computer system. A manual search must be performed to determine the physical location of each computer system.

Therefore, a need exists for a data processing system and method for determining a physical location of a client computer system.

SUMMARY OF THE INVENTION

A data processing system and method are described for determining a physical location of a client computer system. The client and server computer systems are coupled together to form a local area network. Identifying information is associated with a tag. The client computer system transmits a wireless query signal to a physical region. In response to the tag being located within the physical region, the tag receives the wireless query signal. In response to a receipt of the query signal by the tag, the tag transmits a reply signal. The reply signal includes the identifying information. In response to a receipt of the reply signal by the client computer system, the physical location of the client computer system is determined utilizing the identifying information.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
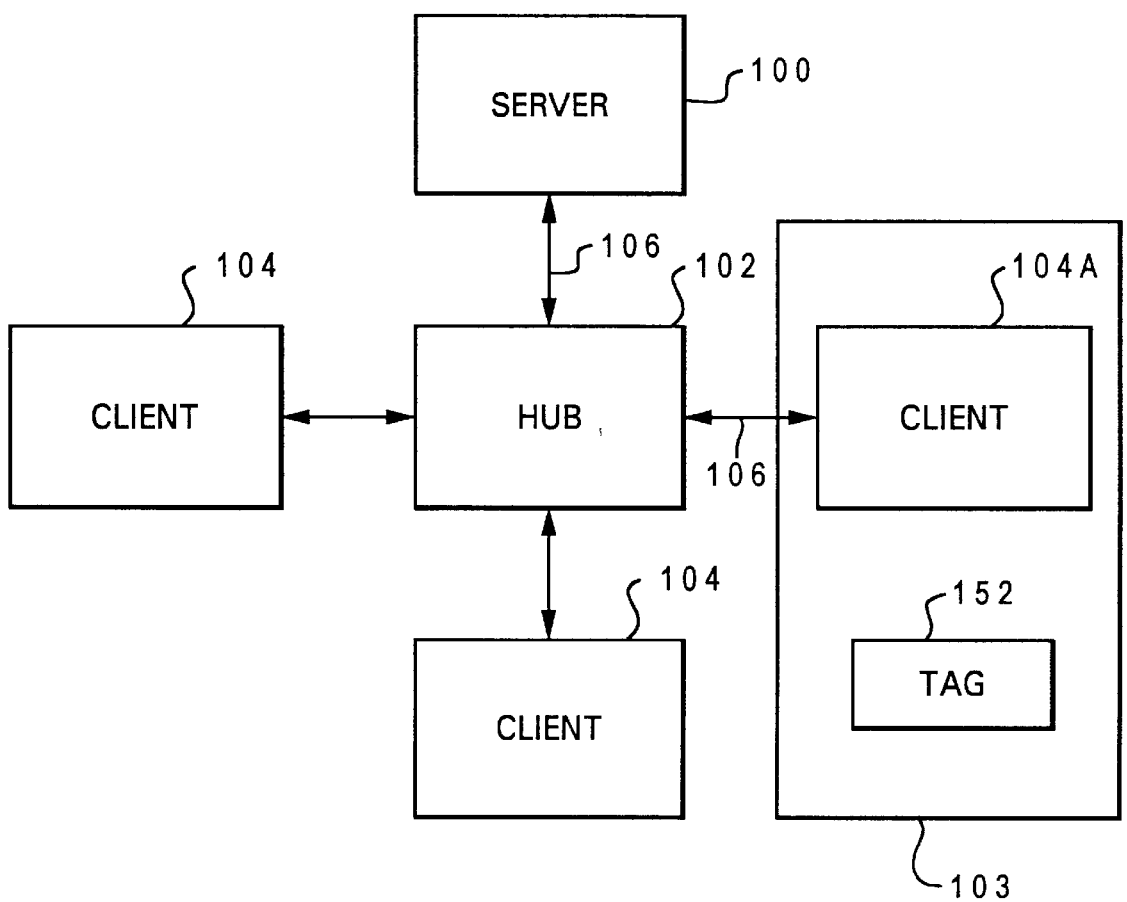
FIG. 1 depicts a pictorial representation of a data processing system including a plurality of client computer systems 104 coupled to a server computer system 100 utilizing a hub 102 to form a network in accordance with the method and system of the present invention.

A preferred embodiment of the present invention and its advantages are better understood by referring to FIGS. 1–6 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a data processing system and method for determining a physical location of a client computer system. The client computer system is coupled to a server computer system to form a local area network (LAN). Identifying information is associated with a tag. The client computer system transmits a wireless (RF) query signal to a physical region within which the client computer system is located. If the tag is also located within the physical region, it will receive the query signal. In response to the tag receiving the query signal, the tag transmits a wireless (RF) reply signal which includes the identifying information. In response to the client computer system receiving the reply signal, the physical location of the client computer system is determined. A tag is a marker used for identification. The tag may be applied to a surface, such as to an outlet utilized to couple the client to the server or to a desk or other structure. A tag is capable of transmitting and/or receiving wireless radio frequency (RF) signals. A tag is also capable of storing data received within a wireless signal. The tag is preferably a programmable RF identification tag.

Either the client or the server may determine the physical location of the client utilizing the identifying information. The client computer system may transmit the identifying information to the server. The server then utilizes the identifying information to determine the physical location of the client.

The client computer system is capable of transmitting a wireless signal to a physical region. The strength of the wireless signal will determine the size of the physical region. Any tags located within the physical region will receive the wireless query signal. All tags located outside of the physical region will not receive the wireless query signal. Any tag which has received the query signal will respond by transmitting a reply signal which includes the identifying information associated with the tag.

A tag is initialized by the client computer system transmitting an initialization signal to the tag. The initialization signal includes the identifying information which becomes associated with the tag once it is received by and stored within the tag.

The identifying information may include any type of information which might be utilized to determine the physical location of the tag, and hence the physical location of the client computer system. For example, the identifying information might include an identification of a building or room in which the tag is located. The identifying information might include a serial number of either the tag or another device, such as a device to which the tag is applied.

The client may poll the tag to determine the identifying information stored within the tag by transmitting a wireless query signal. When the receiver within the tag receives the query signal, the tag's transmitter will then respond by transmitting a reply signal. The reply signal includes the identifying information stored within the tag.

FIG. 1 depicts a pictorial representation of a data processing system including a plurality of client computer systems 104 coupled to a server computer system 100 utilizing a hub 102 to form a network in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

Client 104A is included within a physical region 103 which also includes a tag 152. Physical region 103 is determined by the strength of a wireless signal transmitted by client 104A.

Figure 2:
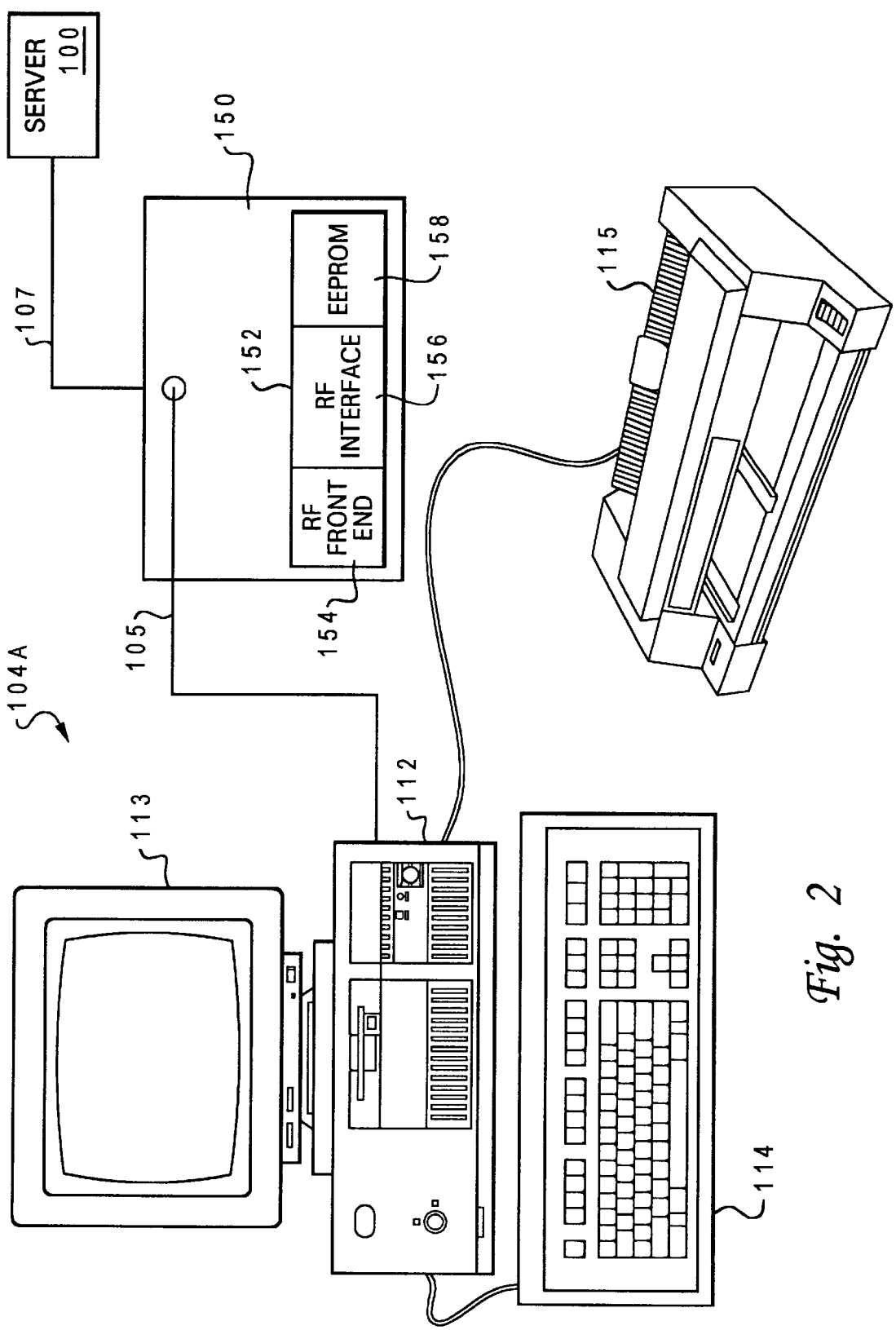
FIG. 2 illustrates a pictorial representation of a computer system which may be utilized to implement a server or client computer system described in FIG. 1, and a local area network outlet coupling the client to a server in accordance with the method and system of the present invention.

FIG. 2 illustrates a pictorial representation of a computer system which may be utilized to implement a server or client computer system described in FIG. 1, and a LAN outlet utilized to couple the client to a server in accordance with the method and system of the present invention. Computer system 104A includes a computer 112, a monitor 113, a keyboard 114, and a printer or plotter 115.

Client 104A is coupled to server 100 utilizing an outlet 150 to form a local area network. A first cable 105 is utilized to coupled client 104A to outlet 150. A second cable 107 is utilized to coupled server 100 to outlet 150. In one embodiment, a programmable tag 152 is associated with and physically coupled to outlet 150. Tag 152 may alternatively be applied to a wall or be associated with a room or a building. Tag 152 may be applied to and associated with a desk or other furniture or device.

Tag 152 includes an RF front end 154 which includes a wireless transmitter and a wireless receiver, a wireless (RF) interface 156 for receiving and sending signals to/from front end 154, and a storage device 158 such as an electronically erasable memory (EEPROM). Preferably, a tag is implemented utilizing a model AT24RF08 commercially available from Atmel Corporation located in San Jose, California. Tag 152 transmits the contents of storage device 158 in response to a receipt of a wireless signal as described below.

Figure 3:
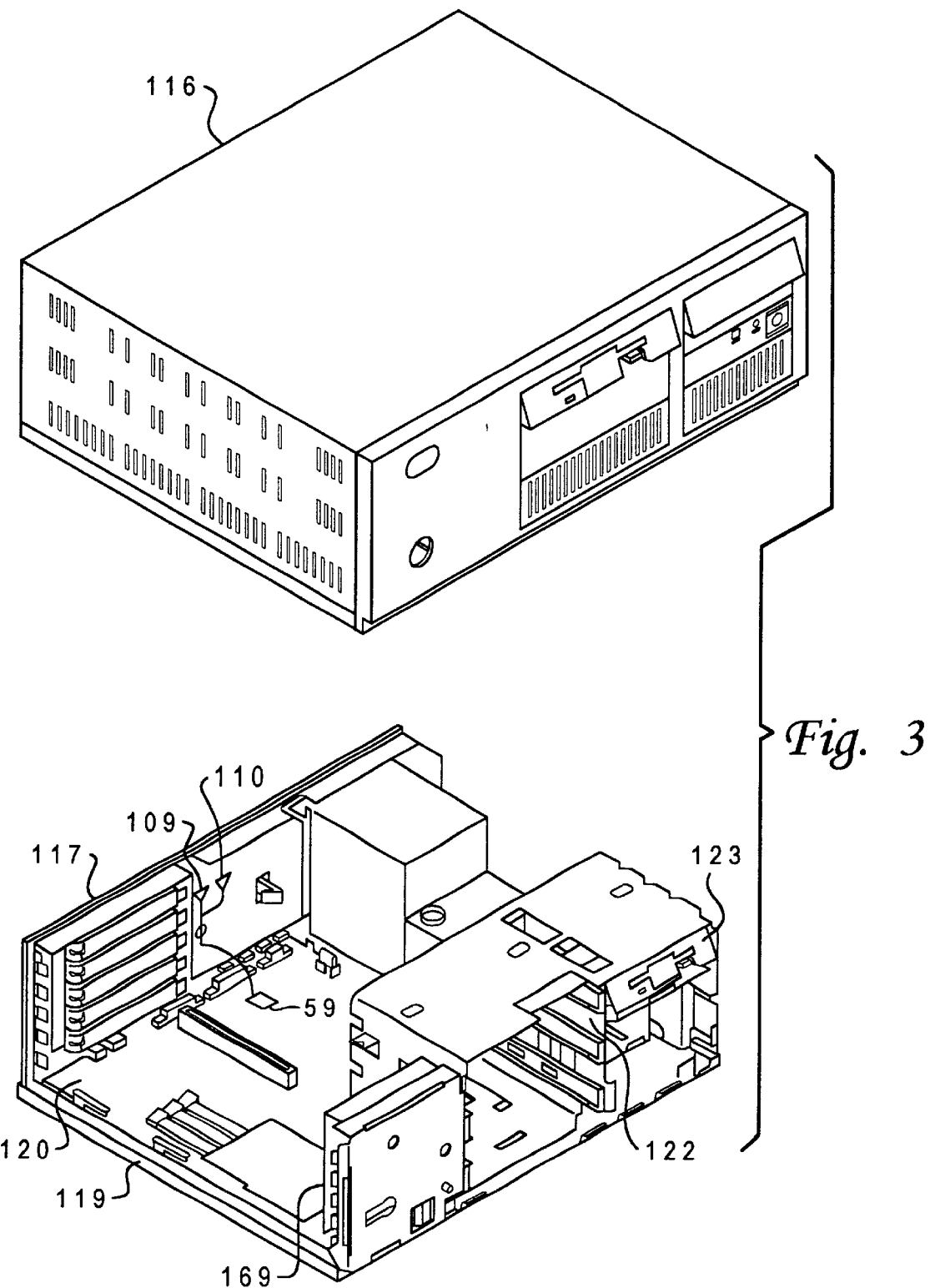
FIG. 3 depicts a pictorial representation of an exploded view of computer 104A in accordance with the method and system of the present invention.

FIG. 3 depicts a pictorial representation of an exploded view of computer 112 in accordance with the method and system of the present invention. Computer 112 has a cover 116 which cooperates with a chassis 119 in defining an enclosed shielded volume for receiving data processing and storage components for processing and storing digital data. At least certain of the system components are mounted on a multi-layer planar 120 (also commonly called a motherboard system board) which is mounted on the chassis 119 and provides a means for mounting and electrically interconnecting various components of computer 112 including the CPU, system memory, and accessory cards or boards as is well known in the art.

Chassis 119 has a base and a rear panel 117 and defines at least one open bay 122 for receiving a data storage device such as a disk drive 123. Antennas 109 and 110 are mounted to extend outside computer 112 to collect radiation having a predefined characteristic. Antennas 109, 110 are intended to provide a signal to system 104A indicating radiation having the predefined characteristic in the vicinity of computer system 104A. In the preferred embodiment, the predefined characteristic represents the wireless reply signal.

Figure 4:
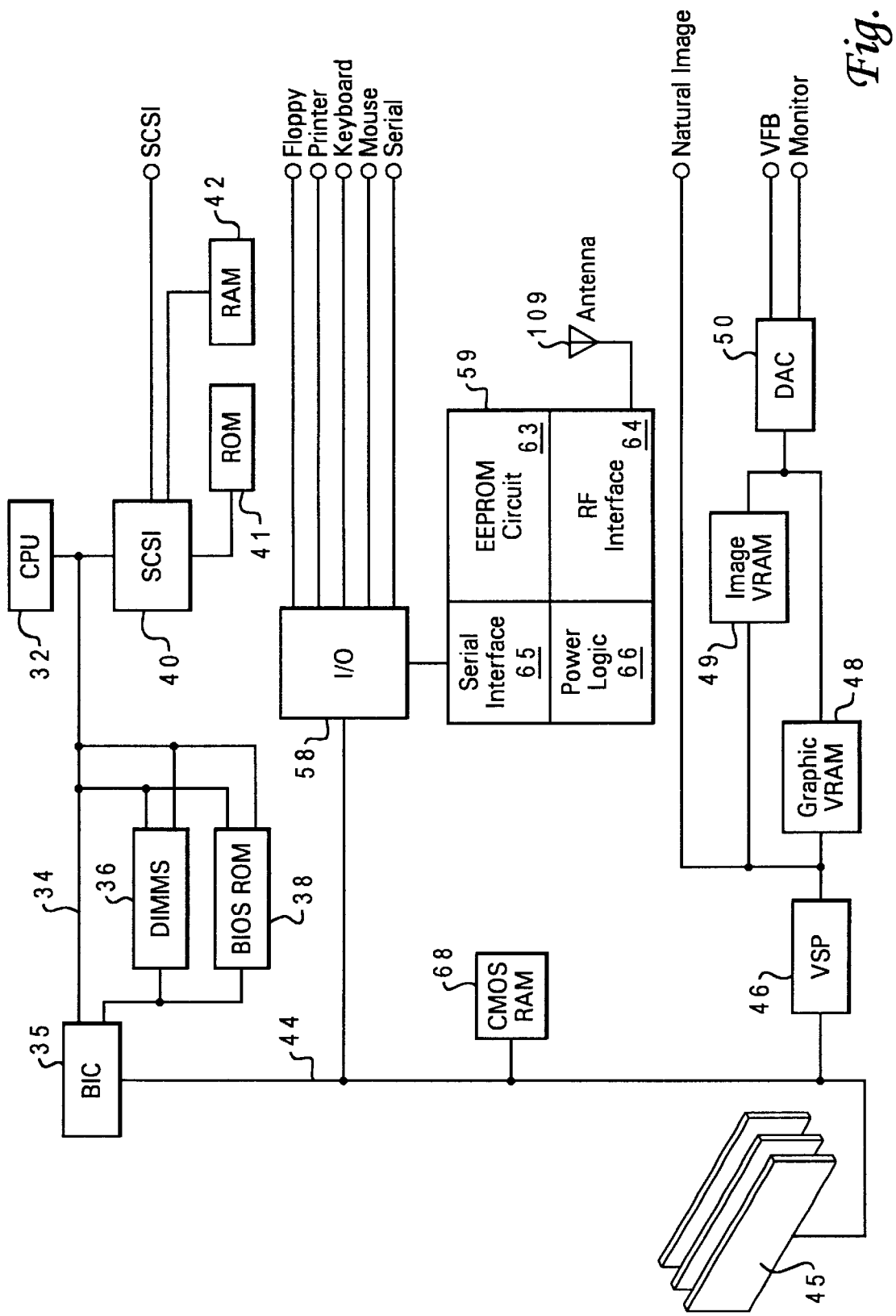
FIG. 4 illustrates a high level block diagram of computer system 104A illustrating the various components of computer system 104A in accordance with the method and system of the present invention.

FIG. 4 illustrates a high level block diagram of computer system 104A illustrating the various components of computer system 104A in accordance with the method and system of the present invention, including components mounted on the planar 120 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMS), and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory 68 (conventionally CMOS RAM) for receiving and retaining data regarding the system configuration and a real time clock (RTC).

While the present invention is described as being implemented utilizing the system block diagram of FIG. 4, it is to be understood at the outset of the description which follows that it is contemplated that the apparatus and methods in accordance with the present invention may be used with other hardware configurations of the planar board. For example, the system processor could be an INTEL Pentium or Pentium II microprocessor.

Returning again to FIG. 4, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along I/O bus 44 are a variety of I/O components such as a video signal processor 46 which is associated with video RAM (VRAM) for storing graphic information 48 and for storing image information 49. Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc.

The I/O bus 44 is coupled utilizing an input/output controller 58 and to an associated Electrical Erasable Programmable Read Only Memory (EEPROM) 59. Conventional peripherals, such as floppy disk drives, a printer or plotter 115, keyboard 114 and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for transmitting and receiving wireless signals, and a power management logic circuit 66.

Figure 5:
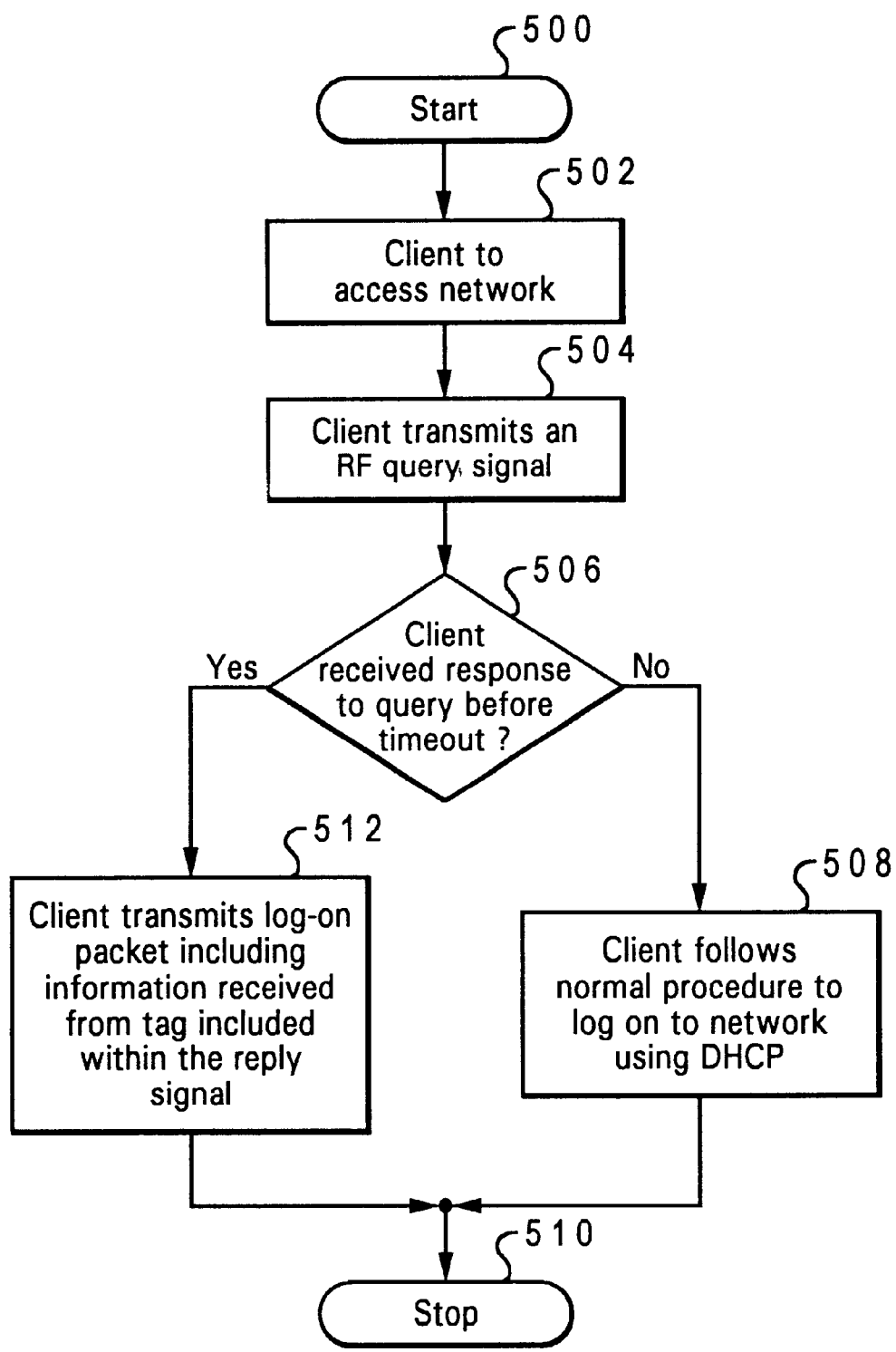
FIG. 5 depicts a high level flow chart which illustrates a transmission by a client computer system of a wireless query signal and the receipt of a wireless reply signal in accordance with the method and system of the present invention.

FIG. 5 depicts a high level flow chart which illustrates a transmission by a client computer system of a wireless query signal and the receipt of a wireless reply signal in accordance with the method and system of the present invention. The process starts as depicted by block 500 and thereafter passes to block 502 which illustrates a determination that a client is to access the network. Next, block 504 depicts a transmission by the client of a wireless query signal utilizing a radio frequency signal. Client 104A transmits a query signal utilizing transmitter/receiver 64. The wireless signal is transmitted to physical region 103. Any tags located within physical region 103 will receive the query signal. Thereafter, block 506 illustrates a determination of whether or not the client has received a wireless reply signal prior to an expiration of a particular period of time. Client 104A is capable of receiving a wireless reply signal utilizing wireless transmitter/receiver 64. If a determination is made that the client has not received a wireless reply signal prior to the expiration of a particular period of time, the process passes to block 508. Referring again to block 506, if a determination is made that the client has received a wireless reply signal prior to the expiration of a particular period of time, the process passes to block 512.

Block 508 depicts the client following a normal procedure to log on to the network. In a preferred embodiment, the client utilizes Dynamic Host Configuration Protocol (DHCP) to dynamically log on to the network. The process then terminates as illustrated by block 510.

Block 512 depicts the client transmitting a log-on packet which includes identifying information received included within the wireless reply signal. The process then terminates as depicted by block 510.

Figure 6:
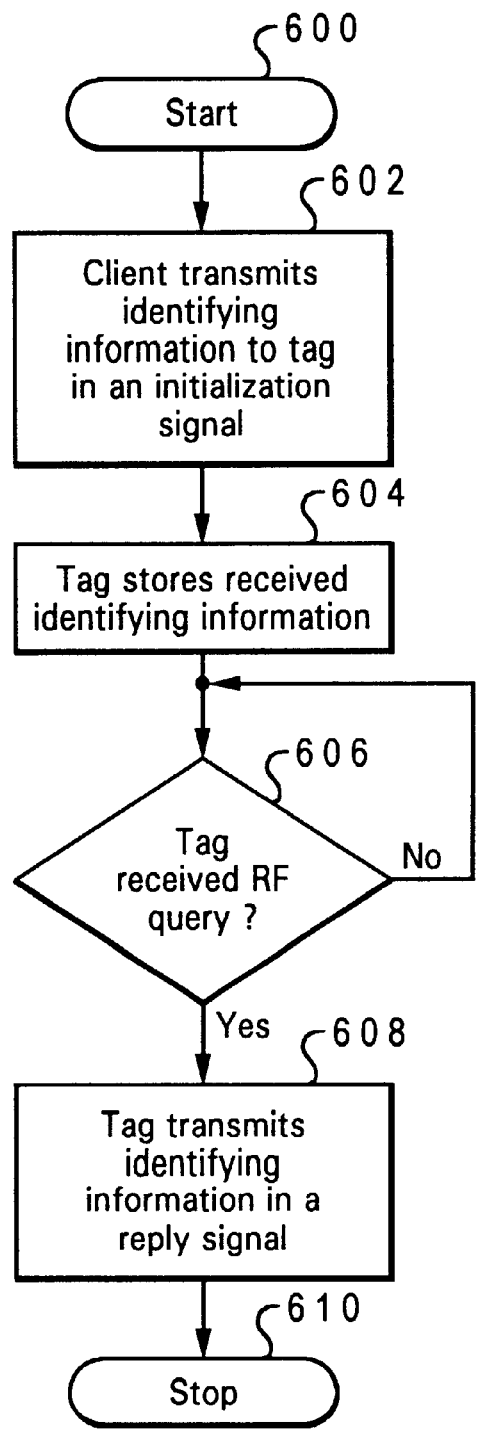
FIG. 6 depicts a high level flow chart which illustrates a client computer system transmitting identifying information to a tag which thereafter may transmit a reply signal including the identifying information in accordance with the method and system of the present invention.

FIG. 6 depicts a high level flow chart which illustrates a client computer system transmitting identifying information to a tag which thereafter may transmit a reply signal including the identifying information in accordance with the method and system of the present invention. The process starts as illustrated by block 600 and thereafter passes to block 602 which depicts a client computer system transmitting identifying information included within an initialization signal to a physical region which includes a tag. Next, block 604 illustrates the tag storing the received identifying information. Thereafter, block 606 depicts a determination of whether or not the tag has received a wireless query signal. If a determination is made that the tag has not received a wireless query signal, the process passes back to block 606.

Referring again to block 606, if a determination is made that the tag has received a wireless query signal, the process passes to block 608 which depicts the tag transmitting a wireless reply signal including its stored identifying information. The process then terminates as illustrated by block 610.

While a preferred embodiment has been particularly shown and described, it will be understood by those skilled in the art that various changes in form and detail may be made therein without departing from the spirit and scope of the present invention.

What is claimed is:

1. A method in a data processing system including a client computer system coupled to a server computer system to form a network for determining a physical location of said client computer system, said method comprising the steps of:

associating identifying information with a tag;

said client computer system transmitting a wireless query signal to a physical region;

in response to said tag being located within said physical region, said tag receiving said query signal and, in response, transmitting a wireless reply signal including said identifying information; and in response to a receipt of said reply signal at said client computer system, determining a physical location of said client computer system utilizing said identifying information.

2. The method according to claim 1, further comprising the step of said client computer system determining said physical location utilizing said identifying information.

3. The method according to claim 1, further comprising the step of said client computer system transmitting said identifying information to said server computer system.

4. The method according to claim 3, further comprising the step of said server computer system determining a physical location of said client computer system utilizing said identifying information.

5. The method according to claim 4, wherein the step of associating identifying information with a tag further comprises the steps of:

said client computer system initializing said tag by transmitting a wireless initialization signal including said identifying information; and said tag storing said identifying information.

6. The method according to claim 5, wherein the step of associating identifying information with a tag further comprises the step of associating an identification of said physical region with said tag.

7. The method according to claim 6, further comprising the step of said client computer system transmitting said identifying information to said server computer system during said client computer system logging on to said network.

8. The method according to claim 5, wherein the step of associating identifying information with a tag further comprises the step of associating a physical location of a building in which said tag is located with said tag.

9. The method according to claim 5, further comprising the step of coupling said tag to a local area network (LAN) outlet utilized to physically couple said server computer system to said client computer system.

10. The method according to claim 9, wherein the step of associating identifying information with a tag further comprises the step of associating an identification of said LAN outlet with said tag.

11. The method according to claim 10, further comprising the steps of:

coupling said client computer system to said LAN outlet utilizing a first cable; and coupling said server computer system to said LAN outlet utilizing a second cable.

12. A data processing system including a client computer system coupled to a server computer system to form a network for determining a physical location of said client computer system, comprising:

a tag for storing for identifying information associated with said tag;

said client computer system executing code for transmitting a wireless query signal to a physical region;

said tag for receiving said query signal in response to said tag being located within said physical region, and said tag for transmitting a wireless reply signal to said client computer system including said identifying information; and said data processing system executing code responsive to a receipt of said reply signal, for determining a physical location of said client computer system utilizing said identifying information.

13. The system according to claim 12, further comprising said client computer system executing code for determining said physical location utilizing said identifying information.

14. The system according to claim 13, further comprising said client computer system executing code for transmitting said identifying information to said server computer system.

15. The system according to claim 14, further comprising said server computer system executing code for determining a physical location of said client computer system utilizing said identifying information.

16. The system according to claim 15, further comprising:

said client computer system executing code for initializing said tag by transmitting a wireless initialization signal including said identifying information; and said tag for storing said identifying information.

17. The system according to claim 15, further comprising said tag being associated within an identification of said physical region.

18. The system according to claim 15, further comprising said tag being associated with a physical location of a building in which said tag is located.

19. The system according to claim 15, further comprising said tag being coupled to a local area network (LAN) outlet utilized to physically couple said server computer system to said client computer system.

20. The system according to claim 19, said tag being associated with an identification of said LAN outlet.

21. The system according to claim 20, further comprising said client computer system executing code for transmitting said identifying information to said server computer system during said client computer system logging on to said network.

22. The system according to claim 21, further comprising:

said client computer system being coupled to said LAN outlet utilizing a first cable; and said server computer system being coupled to said LAN outlet utilizing a second cable.

23. A data processing system including a client computer system coupled to a server computer system utilizing a network, comprising:

said client computer system being located within a physical region;

a tag including storage, said tag being located within said physical region;

said client computer system executing code for transmitting an initialization signal to said tag, said initialization signal including identifying information which identifies said physical region;

said identifying information being stored within said tag in response to said tag receiving said initialization signal;

said client computer system executing code for transmitting a query signal to said physical region;

said tag being capable of receiving said query signal;

in response to said tag receiving said query signal, said tag being capable of transmitting a reply signal to said physical region, said reply signal including said identifying information;

said client computer system being capable of receiving said reply signal;

said client computer system executing code for transmitting said identifying information received in said reply signal to said server computer system; and in response to a receipt of said transmission by said client computer system, said server computer system executing code for determining a physical location of said client computer system, said server computer system utilizing said identifying information to determine said physical location, wherein said server computer system determines said client computer system is located within said physical region.

* * * * *